(Model.)

G. A. FARRALL.
CORN HARVESTER.

No. 482,551.  Patented Sept. 13, 1892.

(Model.)

G. A. FARRALL.
CORN HARVESTER.

Patented Sept. 13, 1892.

Witnesses:

Inventor:
Geo. A. Farrall
By G. W. Ford Atty (Model.)

G. A. FARRALL.
CORN HARVESTER.

No. 482,551.

Patented Sept. 13, 1892.

Fig. 4.

Witnesses.
Emil Neuhart
Theo. L. Popp

Geo. A. Farrall Inventor.
By Wilhelm Bonner
Attorneys.

(Model.)

G. A. FARRALL.
CORN HARVESTER.

No. 482,551. Patented Sept. 13, 1892.

Witnesses:

Inventor:
Geo. A. Farrall
By G. W. Ford Atty (Model.)

G. A. FARRALL.
CORN HARVESTER.

No. 482,551. Patented Sept. 13, 1892.

Witnesses:
Theo. L. Popp
Emil Neuhart

George A. Farrall,
Inventor.
By Wilhelm Bonner
Attorneys.

UNITED STATES PATENT OFFICE.

GEORGE A. FARRALL, OF BATAVIA, NEW YORK, ASSIGNOR TO THE JOHNSTON HARVESTER COMPANY, OF SAME PLACE.

CORN-HARVESTER.

SPECIFICATION forming part of Letters Patent No. 482,551, dated September 13, 1892.

Application filed May 20, 1890. Serial No. 352,572. (Model.)

*To all whom it may concern:*

Be it known that I, GEORGE A. FARRALL, a citizen of the United States, residing at Batavia, in the county of Genesee and State of New York, have invented a new and useful Improvement in Corn-Harvesters, of which the following is a specification.

This invention relates to that class of corn-harvesters in which the corn is carried past a cutter mechanism so as to sever the stalks from the root and then deliver them to the binder mechanism, whereby the stalks are tied into bundles and discharged from the machine.

The object of my invention is to improve the stalk-carrying mechanism so that the corn is firmly grasped and held in an upright position while the stalks are severed from the roots by the cutter mechanism and delivered upon the binder-table in the proper position for presentation to the binder; also, to render the stalk-carrying mechanism adjustable both vertically and horizontally, which enables the carrying mechanism to grasp short or lodged corn; also, to improve the carrying mechanism of the binder-table, whereby choking of the binder is prevented; also, to improve the harvester in various details, which will be hereinafter more fully described.

In the accompanying drawings, consisting of six sheets.

Like letters of reference refer to like parts in the several figures.

A represents the main driving or master wheel provided on its inner side with an internal gear-wheel $A'$, which latter meshes with a pinion $A^2$, secured to the outer end of a transverse shaft $a$, journaled in suitable bearings on the main frame. The inner end of the shaft $a$ is provided with a bevel gear-wheel $A^3$, which latter meshes with a bevel-pinion $A^4$, secured to the rear end of a longitudinal shaft $a'$, journaled in suitable bearings on the main frame, and provided at its front end with a crank-disk $a^2$, having a pitman $a^3$, whereby a reciprocating motion is imparted to the cutter-bar $a^4$, arranged on the finger-bar B. The latter is provided with the usual knife-guards $B'$; but the cutting mechanism can be of any other suitable construction and the drive mechanism may likewise be of any other well-known and common construction.

The main frame for supporting the various parts of the harvester is constructed as follows:

$C\,C'$ represent two longitudinal beams arranged lengthwise on the outer and inner sides of the driving-wheel and connected at their front ends by a cross-piece $C^2$, while their rear ends are connected by a transverse beam $C^3$, extending across the full width of the machine. The finger-bar is secured with its inner end to the central portion of the beam $C'$, and is connected with the harvester-beam $C^3$ by means of beams $C^4\,C^5$, connecting the outer ends and the central portions of the finger-bar and transverse beam $C^3$. The cornward end of the main frame is supported by a wheel $B^2$, which is journaled on an adjustable bearing $b$, attached to the cornward end of the main frame, whereby the latter may be raised or lowered. This adjustable bearing consists, essentially, of a vertical plate $b'$, which slides in a guide $b^2$, secured to the main frame and provided with an arbor, which supports the grain-wheel $B^2$.

Figures 10, 17:
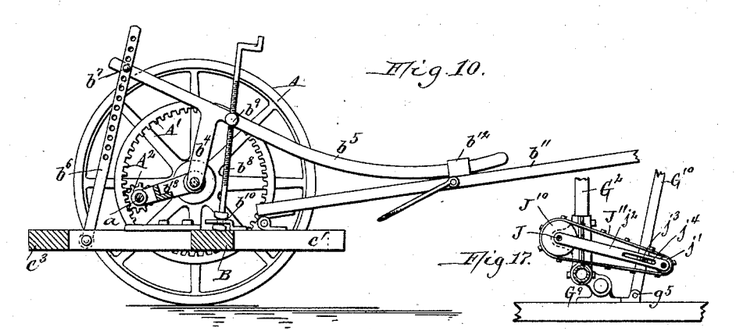
Fig. 10 is a vertical section in line $x\,x$, Fig. 4, showing the manner of raising and lowering the drive-wheel end of the main frame.
Fig. 17 is a detached elevation of the pulleys and belt carrying the butt-ends of the stalks after they are severed from the roots.

$b^3$ represents a pawl, which is pivoted to the guide $b^2$ and engages with one of a series of notches formed in the side of the sliding plate. This adjusting device may, however, be of any other suitable and well-known construction. The drive end of the main frame is adjustably supported on the drive-wheel, as follows, and is best shown in Fig. 10.

$b^4$ represents a standard pivotally supported with its lower end on the inner end of the drive-wheel axle and provided at its upper end with a longitudinally-supporting bar $b^5$.

$b^6$ represents an upright bar pivotally secured with its lower end to the rear end of the main frame and connected at its upper end with the rear end of the supporting-bar $b^5$ by means of a bolt $b^7$. A series of bolt-openings are preferably formed in the upright bar $b^6$, so as to enable the main frame to be adjusted vertically.

$b^8$ represents an upright adjusting-screw, which passes through a screw-threaded swivel-post $b^9$, secured to the supporting-bar $b^5$ in front of the drive-wheel axle. The lower end of this adjusting-screw is connected to the main frame by means of a swivel-joint $b^{10}$, and is provided at its upper end with a crank-handle for turning the same. When it is desired to raise the drive end of the machine, the adjusting-screw $b^8$ is rotated in the proper direction and the bolt $b^7$ removed and reinserted in one of the lower openings of the upright bar $b^6$. In order to tilt the machine, so as to incline the cutter mechanism, it is only necessary to raise or lower the front end of the main frame, which is effected by simply rotating the adjusting-screw $b^8$ in the proper direction.

$b^{11}$ is the pole, which is pivotally secured with its rear end to the front end of the main frame and provided on its upper side with a loop $b^{12}$. The front end of the supporting-bar $b^5$ is preferably curved and passes loosely through the loop of the pole, whereby the latter is supported and held in its proper relative position when the main frame is adjusted.

The shaft $a$ is preferably connected with the axle of the drive-wheel by means of a connecting-bar $b^{13}$, so as to cause the pinion $A^2$ to move concentric with the drive-wheel during adjustment of the main frame and retain the pinion in proper engagement with the internal gear-wheel $A'$.

For the purpose of presenting the corn properly to the cutter mechanism and delivering it upon the binder-table H, located in rear of the latter, a gathering and carrying mechanism is provided, consisting, essentially, of a series of endless belts and gathering-boards, which are arranged and operated as follows:

D represents the inner or stubbleward gathering-board, D' the outer or cornward gathering-board, and $D^2$ the intermediate gathering-board arranged between the boards D D'. These boards are arranged lengthwise above the cutter mechanism and separated a sufficient distance to form passages $D^3$ $D^4$ for the passage of the cornstalks, and the front ends of the boards are tapered so as to facilitate the entrance of the corn into these passages.

$D^5$ represents tubular supporting-bars, one of which is arranged lengthwise underneath each gathering-board and parallel therewith. Each of the supporting-bars is provided on its upper side, near opposite ends, with upright brackets E, having transverse arms $e$, upon which the gathering-boards are supported. The gathering-boards are secured to these arms $e$ by means of bolts $e'$, passing through said boards and slots $e^2$, formed in the arms $e$, whereby said boards may be adjusted transversely. The front end of each supporting-bar is preferably curved upward and secured to the under side of the front end of its respective gathering-board.

G G' $G^2$ represent rocking standards which form the pivotal supports for the gathering and carrying mechanism. Each of these standards is provided at its upper end with ears $G^3$, which are pivotally secured by bolts $g$ to brackets $G^4$, secured centrally to the lower side of the supporting-bars. The lower ends of the standards G G' $G^2$ are secured to a transverse rock-shaft $G^5$ by means of bifurcated connecting-plates $G^6$, provided with suitable curved faces, which embrace the standards and the rock-shaft and are secured thereto by bolts.

$G^7$ $G^8$ $G^9$ represent bearings in which the rock-shaft $G^5$ is supported. Each of these bearings consists of a base-plate $g'$, secured to the finger-bar and provided with an adjustable arm $g^2$, which latter is provided at its outer end with the journal for the rock-shaft $G^5$. The opposite end of the arm $g^2$ is secured to a lug $g^3$ on the base-plate by means of a pivot-bolt $g^4$. The contiguous faces of the adjustable arm and the lug of the base-plate are provided with radial serrations, which engage with each other when the pivot-bolt is tightened and prevent the adjustable arm from turning. By loosening the pivot-bolt $g^4$ and swinging the arm $g^2$ up or down the rock-shaft $G^5$ and the entire gathering mechanism attached thereto can be raised or lowered to adjust it to the approximate height of the corn. After adjustment the pivot-bolt $g^4$ is again tightened and the adjustable arm of the bearing is firmly held in place.

I represents a hand-lever whereby the standards supporting the gathering mechanism are rocked. This lever is provided with a sleeve $i$, which surrounds the inner end of the rock-shaft $G^5$ and is held against turning thereon by a pin $i'$. By throwing the hand-lever forward the gathering mechanism is thrown forward and tilted downward at its front end, so as to permit lodged or leaning corn to be picked up. The pin $i'$ of the rock-shaft is arranged in a longitudinal slot in the sleeve $i$ of the hand-lever, so as to permit the latter to move lengthwise on said shaft, and the sleeve is also provided with radial notches or serrations $i^2$, which are adapted to engage with similar serrations in the adjacent bearing $G^7$, whereby the gathering mechanism can be held in position after adjustment. Any other well-known and suitable device for retaining the rocking standards in their adjusted position may, however, be substituted for that herein shown and described.

$d\ d'$ represent upright bearings supporting the pulleys which carry the upper portion of the stubbleward gathering-belt $D^6$. These bearings are arranged between the stubbleward supporting-bar and the gathering-board near opposite ends thereof and are each provided with a laterally-projecting arm $d^2$, secured to a supporting-block $d^3$, which latter is clipped to the upper side of the adjacent tubular supporting-bar. The bearings $d\ d'$ are preferably secured to the blocks $d^3$ by a bolt $d^4$, passing through a slot in the arms $d^2$, whereby the bearings are capable of lateral adjustment. The stubbleward belt $D^6$, as most clearly shown in Fig. 11, passes around the receiving-pulley $d^5$, mounted at the upper end of the front bearing $d$, thence rearward and around a delivering-pulley $d^6$, mounted at the upper end of the rear bearing $d'$, thence forward and downward and around an intermediate or transfer pulley $D^7$, thence rearward and downward and around a drive-pulley $D^8$, thence forward and upward and around the opposite side of the intermediate pulley $D^7$, thence obliquely forward and around a receiving-pulley $d^7$, mounted on the lower end of the front bearing $d$, thence rearward and around a delivery-pulley $d^8$, mounted on the lower end of the rear bearing $d'$, and thence forward and obliquely upward to the place of beginning. The blocks supporting the bearings $d\ d'$ are capable of lengthwise adjustment on the supporting-bars by means of the clips, so as to enable the belt $D^6$ to be tightened. Those portions of the stubbleward belt running directly from the receiving-pulley $d^5$ to the delivery-pulley $d^6$ and from the receiving-pulley $d^7$ to the delivery-pulley $d^8$ are parallel and vertically in line and constitute a double grasping and carrying surface of this belt.

Figures 5, 6, 7, 8, 9:
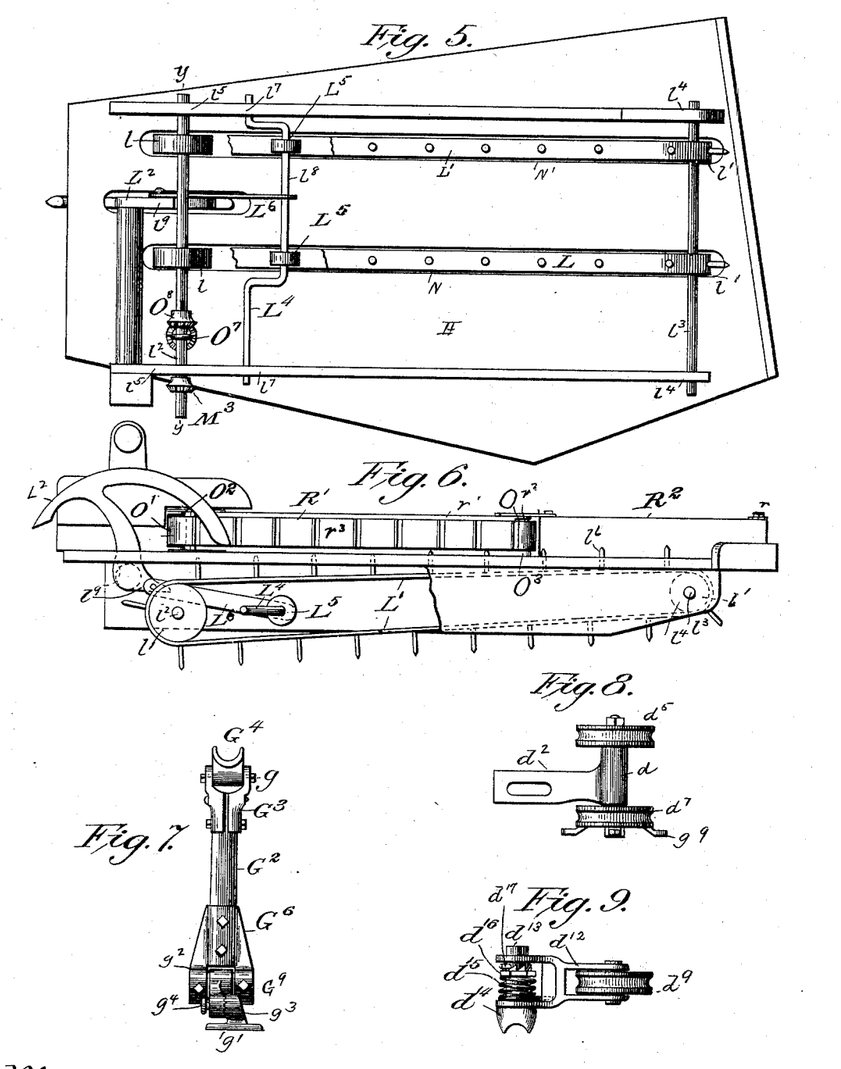
Fig. 5 is a detached bottom plan view of the binder-table.
Fig. 6 is a rear elevation of the binder-table with a portion of the frame broken away.
Fig. 7 is a detached front elevation of one of the adjustable standards supporting the stalk-carrying mechanism.
Fig. 8 is a similar view of one of the adjustable bearings and pulleys for supporting the carrying-belts.
Fig. 9 is a similar view of one of the tension-pulleys for supporting the carrying-belts.
Figures 11, 12, 13, 14, 15:
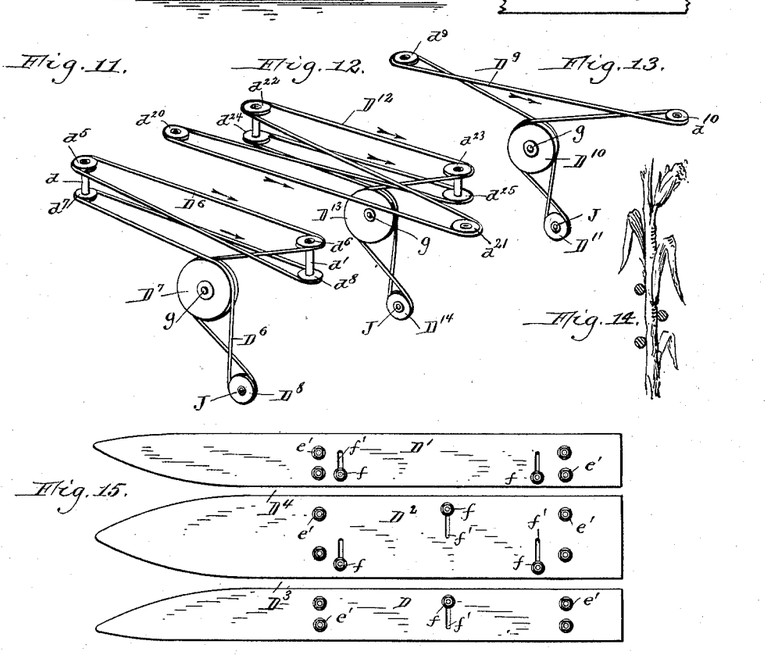
Figs. 11, 12, and 13 are perspective views of the several belts and their supporting-pulleys, which transport the cornstalks past the cutter mechanism and to the binder-table.
Fig. 14 represents the manner in which a cornstalk is grasped from opposite sides by the system of belts comprising the stalk-carrying mechanism.
Fig. 15 is a top plan view of the gathering-boards.
Figure 16:
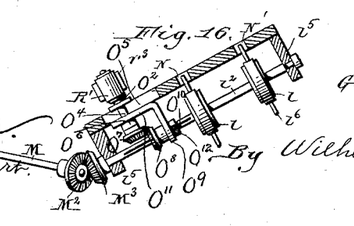
Fig. 16 is a transverse section of the binder-table in line $y\,y$, Fig. 5.

$D^9$ represents the cornward gathering-belt, which is best shown in Fig. 13, and passes around a receiving-roller $d^9$, supported on the cornward supporting-bar $D^5$, thence rearward and around a delivery-pulley $d^{10}$, supported on the rear end of said bar, thence forward and downward around an intermediate or transfer pulley $D^{10}$, thence rearward and downward around a drive-pulley $D^{11}$, thence forward and upward and around the opposite side of the intermediate pulley $D^{10}$, and thence forward and upward to the place of beginning. The delivering-pulley $d^{10}$ is supported and journaled in a bearing similar in construction to the bearings $d\ d'$. The receiving-pulley $d^9$ is journaled in the outer end of an arm $d^{12}$, which latter is pivoted with its opposite end on a post $d^{13}$, secured to a block $d^{14}$ on the supporting-bar, as represented in Fig. 9.

$d^{15}$ represents a coil-spring surrounding the post $d^{13}$ and bearing with its ends against the arm $d^{12}$ and a serrated collar $d^{16}$, arranged on the post $d^{13}$. The collar $d^{16}$ is held in position by a transverse pin $d^{17}$, passing through the post $d^{13}$ and engaging with the serrations of the collar. By turning the latter more or less tension can be placed on the receiving-pulley $d^9$, thereby keeping the cornward belt taut at all times. If the tension of the spring $d^{15}$ is insufficient to keep the belt taut, the block $d^{14}$, supporting the tension-bearing, can be adjusted lengthwise on the supporting-bar. For this purpose the supporting-bar is provided with a series of vertical openings $d^{18}$, which receive a bolt for securing the block $d^{14}$. That portion of the cornward belt running directly from the receiving-pulley $d^9$ to the delivery-pulley $d^{10}$ constitutes the effective carrying-surface of this belt.

When it is desired to employ but a single gathering and carrying passage in a corn-harvester, the stubbleward belt is placed adjacent to the cornward belt, so that the single carrying portion of the latter will be arranged midway between the double carrying portions of the stubbleward belt and parallel in line therewith. By this arrangement the corn is grasped by the belts at three points, which insures a firm grip on the cornstalk and a positive feed of the belts, as shown in Fig. 14.

Figure 1:
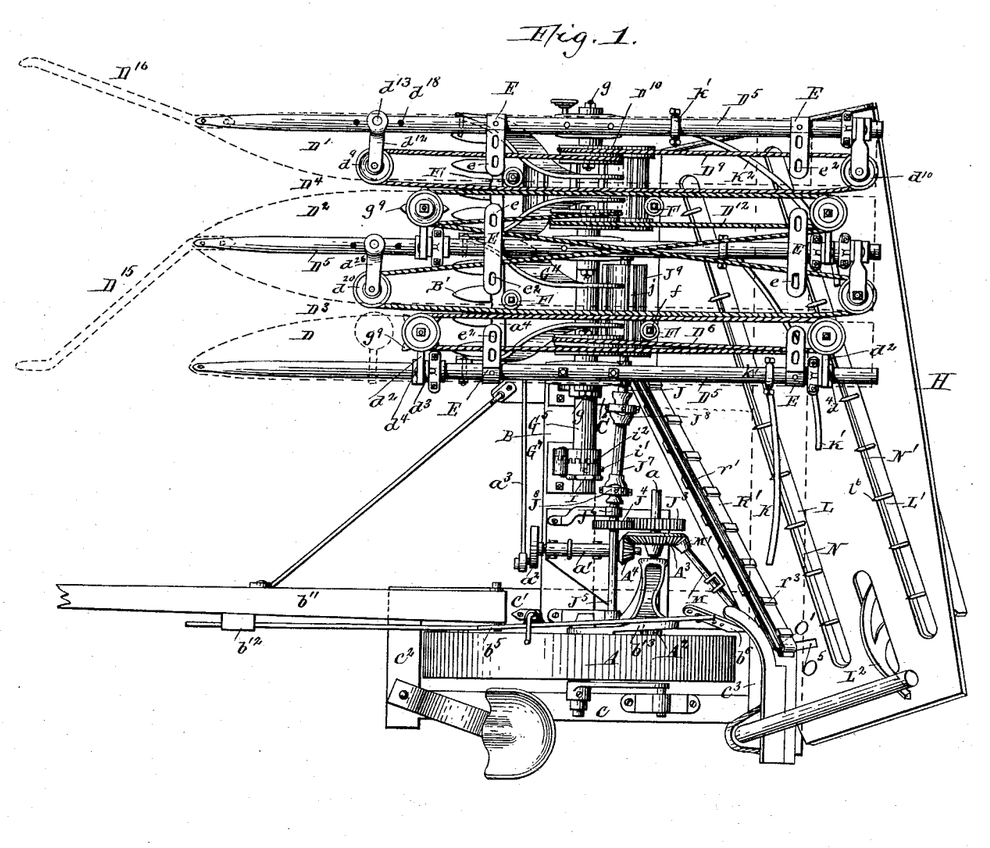
Figure 1 is a top plan view of the harvester with the gathering-boards removed.
Figure 2:
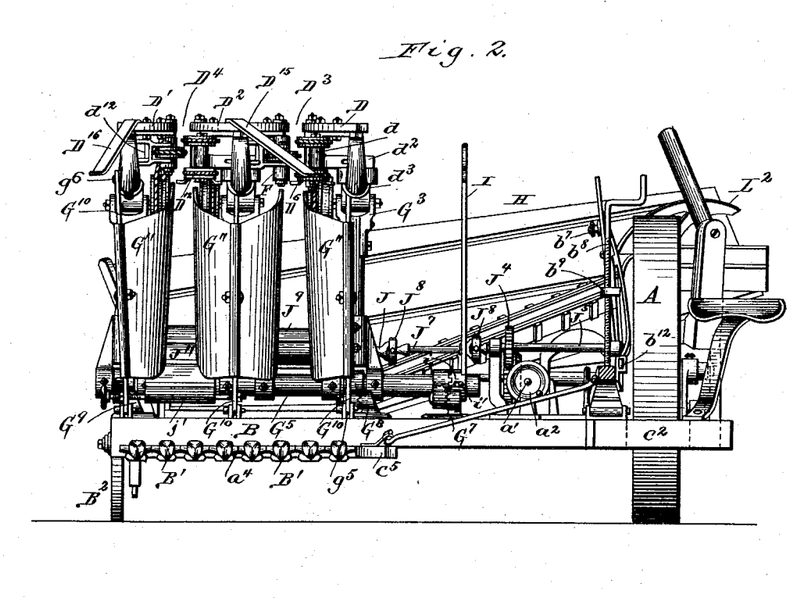
Fig. 2 is a front elevation thereof.
Figure 3:
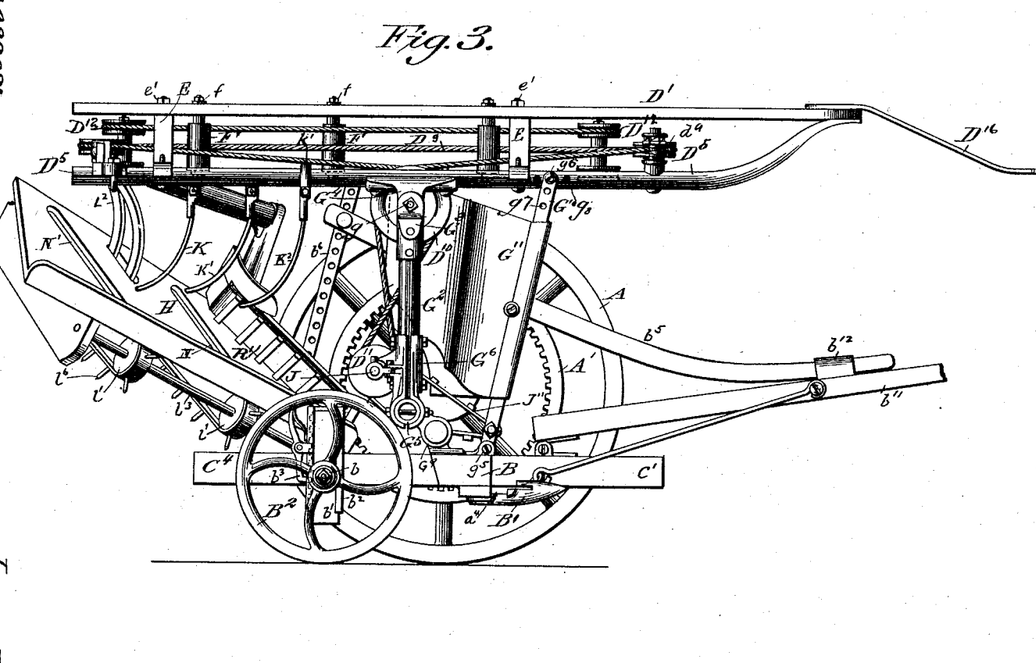
Fig. 3 is a side elevation of the harvester viewed from the corn side.
Figure 4:
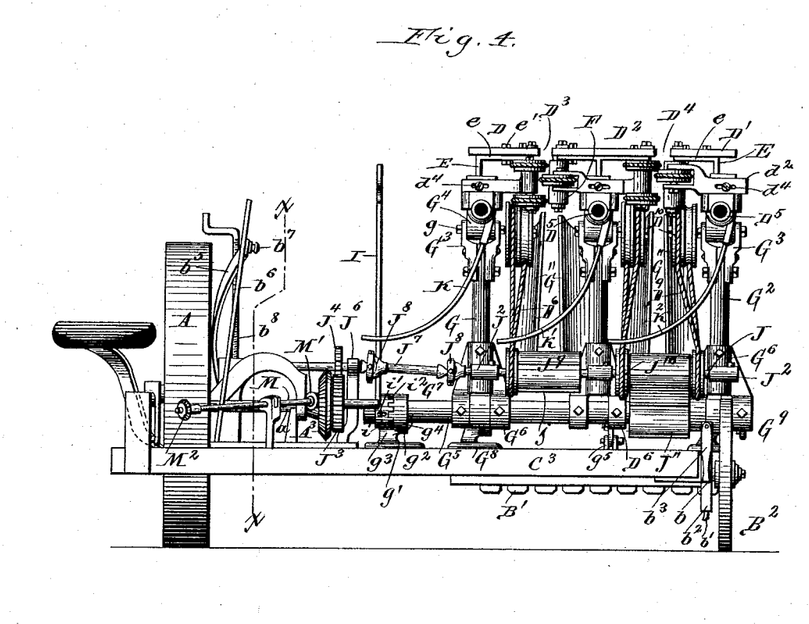
Fig. 4 is a rear elevation with the binder-table removed.

In machines of large capacity it is desirable to employ a number of gathering-passages, as represented in Fig. 1. For this purpose an intermediate endless belt $D^{12}$ is arranged between the cornward and stubbleward belts and which is adapted to operate in conjunction with both of these belts. The intermediate belt $D^{12}$ passes with its front portion around a receiving-pulley $d^{20}$, thence rearwardly and around a delivery-pulley $d^{21}$, thence obliquely forward and around a receiving-pulley $d^{22}$, thence rearward and around a delivery-pulley $d^{23}$, thence forward and downward and around an intermediate or transfer pulley $D^{13}$, thence backward and downward and around a drive-pulley $D^{14}$, thence forward and upward and around the opposite side of the intermediate pulley $D^{13}$, thence forward and around a receiving-pulley $d^{24}$, thence backward and around a delivering-pulley $d^{25}$, and thence obliquely forward to the place of beginning. In this manner of arranging an intermediate belt a double carrying-line is formed on the side facing the single carrying portion of the cornward belt and also a single carrying-line which faces the double carrying-line of the stubbleward belt.

When the several carrying-belts are in their proper position, the carrying portion of the cornward belt is arranged parallel, and midway between the double lines of the intermediate belt and the single line of the latter is arranged parallel and midway between the double lines of the stubbleward belt, thereby forming a triple grip of the belts on the cornstalks in both passages.

The receiving-pulley $d^{20}$ is supported in a tension-bracket $d^{26}$ similar to the bracket supporting the receiving-pulley $d^9$, while the pulleys $d^{21}$ to $d^{25}$ are each secured to the intermediate supporting-bar in the same manner as the pulleys $d^5$ $d^8$.

The supporting-bars and the several belts and gathering-boards constitute a cornstalk-gathering frame or carrying mechanism, which is capable of being adjusted lengthwise of the machine and also tilted by means of the pivoted standards. When the corn is lodged or leans, the gathering mechanism is thrown forward and sufficiently low to enable the belts to grasp the stalks. The front portion of the gathering mechanism is arranged in advance of the cutter mechanism a sufficient distance to enable the belts to firmly grasp the cornstalks before presenting them to the cutters to be severed from the roots. The belts retain their grasp on the cornstalks after they are severed from the roots and deliver them upon the binder-table located in rear of the gathering mechanism.

$D^{15}$ $D^{16}$ represent gathering-irons, which gather the cornstalks and deliver them all into one of the stalk-passages of the gathering mechanism. These gathering-irons are secured to the front ends of the cornward and intermediate gathering-boards and are bent downwardly, so as to enable them to reach lodged corn. The gathering-irons also diverge forwardly, the iron attached to the intermediate gathering-board being of sufficient length to extend diagonally across the entire path of the stubbleward stalk-passage, so as to prevent any stalks from entering said passage. These gathering-irons are only used when harvesting corn planted in regular rows, in which case the corn is not thick enough to require the use of both stalk-passages.

In harvesting matted or fodder corn, which is sown broadcast, the gathering-irons are dispensed with, which allows the gathering-boards to pass directly into the corn and supply both stalk-passages, thereby utilizing both sets of gathering-belts.

The intermediate or transfer pulleys $D^7$ $D^{10}$ $D^{13}$ are preferably journaled concentric on the bolts $g$, which form the pivotal connections between the upper ends of the rocking standards and the gathering-frame, thereby permitting the gathering-frame to be freely adjusted in any position without interfering with the operation of the carrying-belts. Each of these intermediate pulleys is also provided with two grooves, so as to accommodate the strands of its respective gathering-belt which passes around opposite sides thereof. The driving-pulleys $D^8$ $D^{11}$ $D^{14}$ of the several gathering-belts are all mounted on a transverse shaft J, journaled in bearings $J^2$, formed on the rear side of the bifurcated connecting-plates $G^6$ of the standards, thereby causing these driving-pulleys to move in unison with the standards during adjustment of the latter.

Motion is imparted by the main driving-shaft $a$ to the shaft J and its driving pulleys, as follows: $J^3$ represents a gear-wheel mounted on the inner end of the main driving-shaft $a$ and meshing with a pinion $J^4$, mounted on a counter-shaft $J^5$, journaled in bearings $J^6$, secured to the main frame. The inner ends of the counter-shaft $J^5$ and the pulley-shaft J are connected by a short shaft $J^7$. The latter is provided at opposite ends with a universal joint $J^8$, whereby it is attached to the ends of the counter-shaft and the pulley-shaft J. In this manner considerable freedom of movement is permitted to the pulley-shaft J during its adjustment with the gathering mechanism without affecting its actuating mechanism.

$G^{10}$ represents guide-bars or auxiliary supporting-standards whereby the carrying mechanism is guided during the lengthwise adjustment of the latter. These guide-bars are arranged in front of the rocking standards and secured with their lower ends to the main frame by means of pivots $g^5$, while their upper ends are pivotally secured to the sides of the supporting-bars by bolts $g^6$. The upper ends of the guide-bars and the supporting-bars are provided, respectively, with a series of openings $g^7$ $g^8$, which enable the carrying mechanism to be tilted more or less, and affords a range of adjustment to meet the conditions of the corn to be harvested. In order to facilitate the entrance of the cornstalks between the belts of each carrying-passage, one of the belt-supporting pulleys is arranged a short distance in advance of the other, as represented in Fig. 1, thereby avoiding the liability of crushing the stalks or choking the passage, which would be apt to occur if the pulleys at the receiving end of the belts were arranged face to face. It is also desirable for the same reason to arrange the pulleys supporting the delivery portion of the belts some distance in advance of the pulleys on the opposite side of the passage. In order to insure a positive entrance of the stalks between the belts of each passage, the rearmost of the receiving-pulleys is provided on its lower side with sprockets or teeth $g^9$, which grasp the stalks and force them between the belts.

F represents friction-rollers, which bear against the outer sides of the gathering-belts and prevent the latter from yielding, which would cause them to lose their grip on the stalks. These friction-rollers are arranged in suitable numbers between the receiving and delivery rollers of the belts and are secured to the lower side of the gathering-boards by means of pivot-bolts $f$. The latter are arranged in transverse slots $f'$, formed in the gathering-boards, so as to render the friction-rollers capable of transverse adjustment. These friction-rollers are arranged out of line with each other, so that no two rollers face each other, whereby crushing of the stalks is avoided.

$G^{11}$ represents shields, which prevent the lower ends of the stalks from interfering with the rocking standards and the lower portion of the belt-driving mechanism. Each of the stalk-passages is provided with two of these shields, which latter converge rearwardly and are secured in an upright position at their front ends on the guide-bars. The shields extend rearwardly between the standards a sufficient distance to guide the stalks past the belt-drive and yield sufficient to permit the stalks to pass freely.

$J^9 J^{10}$ represent rollers which engage against the butt-ends of the stalks and assist the gathering-belts in carrying and depositing the stalks properly on the binder-table. These rollers are arranged across the stalk-passages and are mounted on the shaft J. If desired, these rollers may be provided on their peripheries with longitudinal ribs $j$ to render their action more effective, as shown, on the roller $J^9$ underneath the stubbleward passage; but, if desired, an endless belt $J^{11}$ may be employed, as shown, on the roller $J^{10}$ underneath the corn-side passage. In the latter construction the belt $J^{11}$ passes around the roller $J^{10}$, and thence around a smaller roller $j'$, arranged parallel with and in front of the roller $J^{10}$. The smaller roller $j'$ is journaled with its end in sliding bars $j^2$, which latter are pivoted at their rear ends on the shaft J and supported at their front ends by pins $j^3$ on the guide-bars, which pins engage in slots $j^4$, formed in the front ends of the sliding bars $j^2$, as represented in Fig. 17. By forming a sliding support for the front portion of the belt $J^{11}$ the latter is prevented from becoming slack when altering the position of the rocking standards supporting the same.

K K' $K^2$ represent spring guide-arms, which engage against the butt-ends of the stalks as they issue from the stalk-passages and straighten the stalks squarely across the top of the binder-table. One of these spring-arms is secured with its upper end to the rear end of each supporting-bar by means of a clip $k'$ and is curved downward and obliquely rearward toward the binder mechanism with its lower end. The cornstalks when nearing the rear end of the stalk-passages of the gathering mechanism strike the upper portion of the spring-arms K' $K^2$, whereby the butt-ends of the stalks are retarded. As the feed of the stalks continues, the weight of the accumulating stalks gradually depresses the spring-arms until they nearly approach the binder-table, when the stalks slide onto the latter. As the stalks are transported over the binder-table they are carried underneath the spring-arm of the preceding stalk-passage, whereby the stalks are pressed down, so that the whole mass is moved in a compact and straightened position to the binder. The spring-arm K serves to press the stalks issuing from the stubbleward passage down upon the binder-table. The stalks fall on the cornward end of the binder-table and extend with their tops to the rear, while the butts extend forwardly and abut against the butter. The latter is secured lengthwise to the lower end of the binder-table near the front edge thereof and at right angles thereto.

L L' represent the endless belts or apron whereby the stalks are transported across the binder-table to the binder located at the drive end of the latter. These belts are arranged lengthwise underneath the binder-table and pass around pulleys $l$ $l'$, mounted on shafts $l^2$ $l^3$, journaled transversely in bearings $l^4$ $l^5$ near opposite ends of the binder-table. The belts L L' are each provided with a series of outwardly-projecting teeth or sprockets $l^6$, which pass through longitudinal slots N N', formed in the binder-table. These teeth grasp the cornstalks deposited upon the binder-table and forcibly transport them to the binder. The latter may be of any suitable and well-known construction, and the oscillating twine-needle $L^2$ is the only part of said binder which is illustrated in the drawings and which may be actuated from any suitable moving part of the machine.

M represents an intermediate shaft whereby motion is transmitted from the main driving-shaft $a$ to the shaft $l^2$, supporting the drive end of the binder-apron. The intermediate shaft M is journaled in suitable bearings on the main frame and provided at one end with a bevel-pinion M', which engages with the bevel gear-wheel $A^3$ on the shaft $a$, while its opposite end is provided with a bevel-gear $M^2$, which engages with a similar gear $M^3$, secured to the front end of the drive-shaft $l^2$ of the binder-apron.

$L^4$ represents a crank-shaft whereby the carrying portion of the binder-apron is intermittently raised and lowered, so as to regulate the feed of the cornstalks to the binder mechanism. This crank-shaft is journaled transversely in bearings $l^7$ underneath the binder-table and is arranged in the bight of the belts which comprise the carrying-apron of the binder-table. The crank portion $l^8$ of the shaft $L^4$ is provided with two antifriction-rollers $L^5 L^5$, which bear at intervals against the under side of the carrying portion of the apron-belts near the binder-needle and raise the same. When the needle of the binder is depressed into the position to receive the stalks, the crank-shaft raises the upper portion of the apron, so that the full length of the carrying portion of the apron engages with the stalks on the binder-table, thereby causing the entire upper portion of the apron to render effective service in delivering stalks to the binder. When the needle raises, in order to bind the stalks which have been deposited thereon, as represented in Fig. 6, the crank-shaft $L^4$ descends, which causes the carrying portion of the apron adjacent to the needle to descend, thereby depressing the teeth of the apron below the binder-table and rendering this portion of the apron inoperative, although the apron continues to travel. This causes the delivery of the stalks to the needle to be retarded while the latter is binding a bundle, thereby preventing an undue accumulation of stalks adjacent to the needle, and avoids choking of the binder mechanism. After the needle has finished binding a bundle and descends preparatory to receiving another charge of stalks the apron is again elevated by the crank-shaft, which causes the regular delivery of stalks to the needle to be resumed.

$l^9$ represents a depending rock-arm formed with or secured to the lower end of the oscillating binder-needle, from which motion is imparted to the rock-shaft $L^4$. The crank $l^8$ of the latter is connected with the rock-arm of the needle by means of a connecting-rod $L^6$, which causes the needle and the crank-shaft to move in unison.

The butter against which the butt-ends of the stalks engage is composed of two sections $R'$ $R^2$. The latter is arranged on the corn side of the binder-table, and consists, preferably, of an upright board pivoted at its outer end to the upper side of the binder-table by means of a bolt $r$. The other butter-section $R'$ consists of an endless revolving apron arranged in an upright position and passing around the inner and outer supporting-rollers $O$ $O'$. These rollers are journaled in an upright position in suitable movable bearings $O^2$ $O^3$, arranged at opposite ends of a board $r'$, which extends from the inner end of the butter-section $R^2$ to the binder-needle. The adjacent inner ends of the board $r'$, supporting the butter-apron and the butter-section $R^2$, are connected by a link $r^2$, which causes them to move together when it is desired to adjust the butter transversely of the binder-table, in order to adapt it to the length of the stalks. The carrying-face of the butter-apron is preferably provided with a number of vertical ribs $r^3$, which engage against the butts of the stalks and effect a more positive delivery of the stalks to the binder. The outer supporting-roller $O'$ is mounted on the upper end of an upright driving-shaft $O^4$, which latter passes through a transverse slot $O^5$ in the binder-table and is journaled in an adjustable bearing $O^6$. $O^7$ represents a bevel-gear secured to the lower end of the upright shaft $O^4$ and meshing with a similar gear-wheel $O^8$, mounted on the drive-shaft $l^2$ of the binder-apron and journaled in a bearing $O^9$. The gear-wheel $O^8$ is capable of lengthwise adjustment on the shaft $l^2$ by means of a spline $O^{10}$ or equivalent device. The bearings supporting these bevel-gears $O^7$ $O^8$ are connected by an arm $O^{11}$, which causes them to be adjusted simultaneously and retains the bevel-gears in their proper relative position when it is desired to adjust the butter. Any other suitable device may, however, be employed for moving the butter across the binder-table, so as to accommodate short and long stalks and enable the bundles of corn to be bound near the center by the binder mechanism. $O^{12}$ represents a set-screw whereby the bevel-gears are held in place on the shaft $l^2$ after adjustment. The butter-section $R^2$ is arranged practically parallel with the cutter-knives, and the butter-apron $R'$ extends from the inner end of the section $R^2$ obliquely rearward to within a suitable distance of the binder mechanism, which forms an incline, against which the butts of the stalks engage, whereby the latter are moved in the direction of their length and placed in the proper position for presentation to the binder mechanism.

The binder-table and the entire mechanism attached thereto is preferably raised at its rear end so as to incline forwardly with its front end, as shown in the drawings. This causes the stalks to gravitate toward the butter-board, thereby producing an even butt to the bundle as it leaves the binder.

I claim as my invention—

1. In a gathering and carrying mechanism for harvesters, the combination of a belt having a single carrying portion which bears against one side of the stalk, and a belt having two carrying portions which bear against the opposite side of the stalk above and below the single carrying portion, substantially as set forth.

2. The combination, with a system of gathering and carrying belts, pulleys supporting said belts, and longitudinal bars supporting said pulleys, of rocking standards pivotally connected to said bars, whereby the gathering mechanism may be adjusted lengthwise of the machine, substantially as set forth.

3. The combination, with the system of gathering and carrying belts and the pulleys around which these belts run, of bars supporting the pulleys and provided with brackets, gathering-boards supported on said brackets, friction-rollers attached to said boards and bearing against the belts, and rocking standards pivotally connected with said bars, substantially as set forth.

4. The combination, with the system of gathering and carrying belts, the pulleys supporting said belts, and longitudinal bars adjustably supporting said pulleys, of gathering-boards arranged above said belts and supported on said bars, friction-rollers bearing against the belts and adjustably secured to the gathering-boards, and rocking standards pivotally secured with their upper ends to said bars, substantially as set forth.

5. The combination, with the gathering frame and the rocking standards pivotally supporting said frame at their upper ends, of a drive-shaft journaled on the lower portions of said standards, drive-pulleys secured to said shaft, transfer-pulleys journaled concentric with the pivotal connection of the standards and gathering-frame, supporting-pulleys mounted on the front and rear portions of the gathering-frame, and belts running over the drive-pulleys, transfer-pulleys, and supporting-pulleys, substantially as set forth.

6. The combination, with the system of gathering-belts, the gathering-frame supporting said belts, and suitable intermediate mechanism whereby motion is transmitted from the main drive or master wheel to said belts, of rocking standards supporting said gathering-frame at their upper ends, a rock-shaft supporting the standards at their lower ends, and suitable mechanism whereby said rock-shaft is actuated in order to tilt the gathering mechanism, substantially as set forth.

7. The combination, with the system of belts, the gathering-frame supporting said belts, and the rocking standards pivotally supporting said frame at their upper ends, of a drive-shaft journaled on the standards and receiving motion from the main drive or master wheel through intermediate mechanism, drive-pulleys mounted on the drive-shaft, around which the gathering-belts pass, and a rock-shaft journaled in bearings on the main frame and supporting the lower end of the standards, substantially as set forth.

8. The combination, with the gathering and carrying frame and the rocking standards supporting said frame, of a rock-shaft supporting the standards, bearings in which said rock-shaft is journaled, and means whereby said bearings are adjusted in order to raise and lower the gathering mechanism, substantially as set forth.

9. The combination, with the gathering and carrying mechanism, the standards supporting said mechanism, and the rock-shaft supporting said standards, of a bearing-arm provided at one end with a bearing in which said rock-shaft is journaled and provided at its opposite end with a serrated face which engages with similar serrations formed on a base-plate secured to the main frame and a pivot-bolt adjustably securing said bearing to said base-plate, whereby the rock-shaft may be raised or lowered, substantially as set forth.

10. The combination, with the gathering and carrying mechanism, of the rocking standards pivotally supporting the carrying mechanism and a guide-bar pivotally connecting the carrying mechanism with the main frame, whereby the gathering and carrying mechanism is guided in its longitudinal movement, substantially as set forth.

11. The combination, with the gathering and carrying mechanism, of rocking standards supporting said carrying mechanism and upright shields arranged in front of the standards and having their opposing faces on opposite sides of each stalk-passage converging rearwardly, whereby the standards are protected and the stalks are guided past the same, substantially as set forth.

12. The combination, with the gathering and carrying frame, of standards pivotally supporting said carrying-frame, guide-bars pivotally secured with their upper ends to the front portion of the carrying-frame and pivoted with their lower ends to the front portion of the main frame, and rearwardly-extending shields attached to said guide-bars, substantially as set forth.

13. The combination, with the gathering and carrying mechanism which grasps the central portion of the stalks, of rollers arranged transversely underneath the carrying mechanism, a belt passing around said rollers, and rocking standards which support the gathering mechanism and said rollers, substantially as set forth.

14. The combination, with the gathering-frame and the gathering-belts supported thereon, of a binder-table which receives the stalks from said gathering-frame and spring guide-arms secured with their upper ends to the rear end of the gathering-frame and pressing with their lower ends against the stalks on the binder-table, substantially as set forth.

15. The combination, with the cutter mechanism, of a forwardly-inclined binder-table, a butter arranged along the lower end of the binder-table in rear of the cutter mechanism, and a gathering and carrying mechanism extending rearwardly over the butter and table, whereby the stalks are carried over the butter and then dropped upon the table and allowed to align themselves against the butter in rear of the cutter mechanism, substantially as set forth.

16. The combination, with the cutter mechanism and a forwardly-inclined binder-table, of an adjustable butter pivoted at one end to the cornward end of the binder-table and extending inwardly from said pivotal point along the rear side of the cutter mechanism and nearly parallel thereto, and thence obliquely rearward and upward toward the binder mechanism, and a gathering and carrying mechanism whereby the stalks are carried over the butter, substantially as set forth.

17. The combination, with the cutter mechanism, the forwardly-inclined binder-table which receive the stalks, and the binder mechanism, of a stationary butter arranged along the lower front end of the binder-table in rear of the cutter mechanism, a traveling butter extending from the stationary butter inwardly toward the binder mechanism, and a gathering and carrying mechanism whereby the stalks are carried over the stationary butter, substantially as set forth.

18. The combination, with the cutter mechanism and the forwardly-inclined binder-table, of a stationary butter-board arranged transversely upon the binder-table in rear of the cutter mechanism and pivoted on said table with its outer or cornward end, a traveling butter-apron pivotally connected at its outer end to the inner end of the butter-board and adjustably supported at its opposite end upon the stubbleward end of the binder-table, and a gathering and carrying mechanism whereby the stalks are carried over the stationary butter-board, substantially as set forth.

19. The combination, with the cutter mechanism, the forwardly-inclined binder-table arranged in rear of said cutter mechanism, the gathering mechanism whereby the stalks are carried from the cutter mechanism to the binder-table, and the binder mechanism arranged on the stubbleward end of the table, of an adjustable butter consisting of a transverse butter-board arranged upon the binder-table in rear of the cutter mechanism and pivoted at its outer end to the cornward end of said table and a traveling butter-apron movably attached with its inner end to the inner end of the butter-board and adjustably supported with its opposite end upon the stubbleward end of the table adjacent to the binder mechanism, substantially as set forth.

20. The combination, with the main frame supported on opposite sides by a master-wheel and a grain-wheel and the cutter mechanism arranged upon said frame, of a forwardly-inclined stalk-receiving table arranged with its lower front end in rear of the cutter mechanism and adjacent to the grain-wheel and extending obliquely upwardly from the grain-wheel to the rear side of the master-wheel, a binder mechanism arranged upon the stubbleward end of the table in rear of the master-wheel, a sectional butter having one part arranged transversely along the front edge of the table in rear of the cutter mechanism and the other part extending obliquely rearwardly and upwardly toward the binder mechanism, a carrying-apron whereby the stalks are carried from the grainward end of the table to the binder mechanism, and a gathering and carrying mechanism whereby the stalks are carried over the butter, substantially as set forth.

21. The combination, with the binder-table which receives the stalks, of an endless belt arranged lengthwise underneath said table and having teeth which pass through longitudinal slots formed in said table and a crank-shaft which bears alternately against the under side of the carrying portion of the belt, whereby the teeth of the latter are alternately moved above and below the surface of the table, substantially as set forth.

GEORGE A. FARRALL.

Witnesses:
E. J. MOCKFORD,
G. W. FORD.